United States Patent [19]

Cahn et al.

[11] Patent Number: 4,546,552
[45] Date of Patent: Oct. 15, 1985

[54] FLUID INDUCED TRANSVERSE FLOW MAGNETICALLY STABILIZED FLUIDIZED BED

[75] Inventors: Robert P. Cahn, Millburn; Jeffrey H. Siegell, Westfield, both of N.J.

[73] Assignee: Exxon Research and Engineering Co., Florham Park, N.J.

[21] Appl. No.: 607,408

[22] Filed: May 7, 1984

Related U.S. Application Data

[63] Continuation of Ser. No. 345,096, Feb. 2, 1982, abandoned.

[51] Int. Cl.$^4$ .................... F28D 13/00; F26B 17/10
[52] U.S. Cl. ............................ 34/1; 34/10; 210/656; 427/185; 423/DIG. 16; 422/147; 422/143; 422/145; 165/104.16; 209/474; 209/40
[58] Field of Search .............. 209/434, 466, 467, 474, 209/478, 486, 212, 232, 1, 39, 40, 451; 34/1, 10; 165/104.16; 201/31; 422/139, 147, 143–145; 423/DIG. 16; 425/DIG. 2; 427/185, 213; 210/656

[56] References Cited

U.S. PATENT DOCUMENTS

| | | | |
|---|---|---|---|
| 711,016 | 10/1902 | Stebbins | 209/474 |
| 1,291,137 | 1/1919 | Reed | 209/474 |
| 2,586,818 | 2/1952 | Harms | 209/474 |
| 3,367,501 | 2/1968 | Eveson | 209/467 |
| 3,774,759 | 11/1973 | Weintraub et al. | 209/474 |
| 4,071,304 | 1/1978 | Chauvin et al. | 427/213 X |
| 4,115,927 | 9/1978 | Rosensweig | 34/1 |
| 4,132,005 | 1/1979 | Coulaloylou | 34/1 |
| 4,261,109 | 4/1981 | Mikus | 34/1 |

FOREIGN PATENT DOCUMENTS

| | | | |
|---|---|---|---|
| 574549 | 4/1933 | Fed. Rep. of Germany | 209/474 |
| 55-5376 | 6/1980 | Japan. | |
| 564497 | 8/1977 | U.S.S.R. | 34/1 |

OTHER PUBLICATIONS

Shinohara et al., J. of Chem. Eng. of Japan, vol. 6, No. 5, pp. 447–452, (1973).
W. Stegmaier, Fördern and Heben, vol. 26, Nr. 6, pp. 621–624, (1976).

*Primary Examiner*—Frank W. Lutter
*Assistant Examiner*—William Bond
*Attorney, Agent, or Firm*—John W. Ditsler; E. Thomas Wheelock

[57] ABSTRACT

Solids comprising a magnetically stabilized fluidized bed are transported in a direction transverse to the flow of the fluidizing fluid exiting the bed by contacting at least a portion of said solids with fluidizing fluid which enters the bed with a velocity component in the direction of solids flow; i.e. the transverse flow direction. In a preferred embodiment, the fluidizing fluid entering the bed is passed through a distribution means containing propulsion passages slanted in the desired direction of solids flow which serve to orient the fluidizing fluid in the transverse flow direction. Use of this invention eliminates the need for the costly and inconvenient pneumatic, hydraulic and mechanical transport devices employed in the prior art. Solids attrition and elutriation are also reduced.

20 Claims, 16 Drawing Figures

SIDE VIEW

TOP VIEW

TOP VIEW

FLUID INDUCED TRANSVERSE FLOW MAGNETICALLY STABILIZED FLUIDIZED BED

This is a continuation of application Ser. No. 345,096, filed 2/2/82, now abandoned.

FIELD OF THE INVENTION

The present invention relates to a method for transporting magnetically stabilized fluidized solids. More particularly, the invention concerns effecting the transverse flow of solids in magnetically stabilized fluidized beds by contacting said solids with a fluidizing fluid, said fluid being introduced into the bed with a substantial velocity component in the direction of desired solids motion.

BACKGROUND OF THE INVENTION

Many magnetically stabilized fluidized bed (MSB) processes are operated with the direction of solids flow transverse to the flow of an ascending or upward moving fluidizing fluid. Examples of such processes include particulates capture, solids/solids separations and continuous chromatographic separations. In such processes, it is necessary to recycle (often via additional process steps) the bed solids from the outlet to the inlet of the bed. Usually, this is achieved pneumatically or hydraulically using fluid risers or mechanically using bucket elevators. However, such transport methods often result in excessive particle attrition and elutriation, and usually represent a major cost of the operation. In addition, using such solids transport methods to recycle bed solids often results in an increased bed depth near the point at which the solids are reintroduced into the bed and for a substantial distance along the flow direction of said bed. This gradient in bed height may result in fluid maldistribution leading to poor fluid-solids contacting and potential bed destabilization. Also, costly and complex equipment is involved in such methods of solids circulation, which adds appreciably to the overall investment and energy requirements of the operation.

The use of fluid jets to move solid objects and fluidized powders has been disclosed previously (See, for example, U.S. Pat. Nos. 3,131,974; 3,180,688; 3,304,619; Futer, R. E. "Conveying Solids With Cooperating Series of Air Jets," *ASME Symposium on Flow of Solids*, Boston, Mass., Oct. 20-23, 1968 (Paper No. 68-MH-31); Shinohara, K. and Tanaka, T., "A New Device for Pneumatics Transport of Particles," *J. Chem. Eng. of Japan*, 5, 279 (1972); and Woodcock, C. R. and Mason, J. S., "Air Gravity Conveying: Fluidize Your Powder and Let it Slide," *International Powder and Bulk Solids Handling and Processing Conf. Proceedings*, Philadelphia, Pa., May 15-17 (1979), the entire disclosure of each publication being incorporated herein by reference). In the devices disclosed therein, the jets are directed such that the entering fluid has an appreciable component of velocity in the direction of desired solids movement. As such, momentum is transferred to the solids upon contact with said entering fluid. When used in conventional fluidized beds, the fluid not only imparts motion to the solids, but also provides the fluidizing means. However, in conventional fluidized beds, employing the fluid in such a manner may cause excessive and unacceptable attrition and elutriation of the bed solids, fluid bypassing and solids backmixing in both the vertical and horizontal directions, thus decreasing the contacting efficiency of the process.

SUMMARY OF THE INVENTION

Accordingly, the present invention provides an improved method for obtaining continuous flow of solids in a direction transverse to the direction of fluid flow in a magnetically stabilized fluidized bed while minimizing or avoiding the limitations and disadvantages attendant in prior art processes. More specifically, at least a portion of the solids comprising said bed are caused to move in a direction transverse (i.e., nonparallel) to the ascending flow of the fluidizing fluid exiting the bed (normally the upper surface of the bed) by contacting at least a portion of said solids with fluidizing fluid which enters the bed with a substantial velocity component in the direction of solids motion (i.e., the transverse flow direction). The transverse momentum of the fluidizing fluid entering the bed is transferred to the solids causing the transverse flow of the bed, the amount of transverse momentum transferred being dependent upon various operating conditions such as the angle at which said fluid is introduced to the bed, the velocity of the fluidizing fluid, the transverse flowrate of the solids and the like. Preferably, the fluidizing fluid entering the bed is oriented in the direction of solids flow by passage through a distribution means supporting said bed.

The fluidized bed is stabilized by a magnetic means (i.e., a magnetic stabilizing means) which should be of sufficient strength to suppress particle backmixing within the bed but below that which would cause excessive particle to particle attractive forces. Similarly, the superficial velocity of the fluidizing fluid should be in excess of the normal minimum fluidization superficial velocity in the absence of magnetic effects, but below the superficial velocity which will cause solids backmixing.

DETAILED DESCRIPTION OF THE INVENTION

Figure 1:
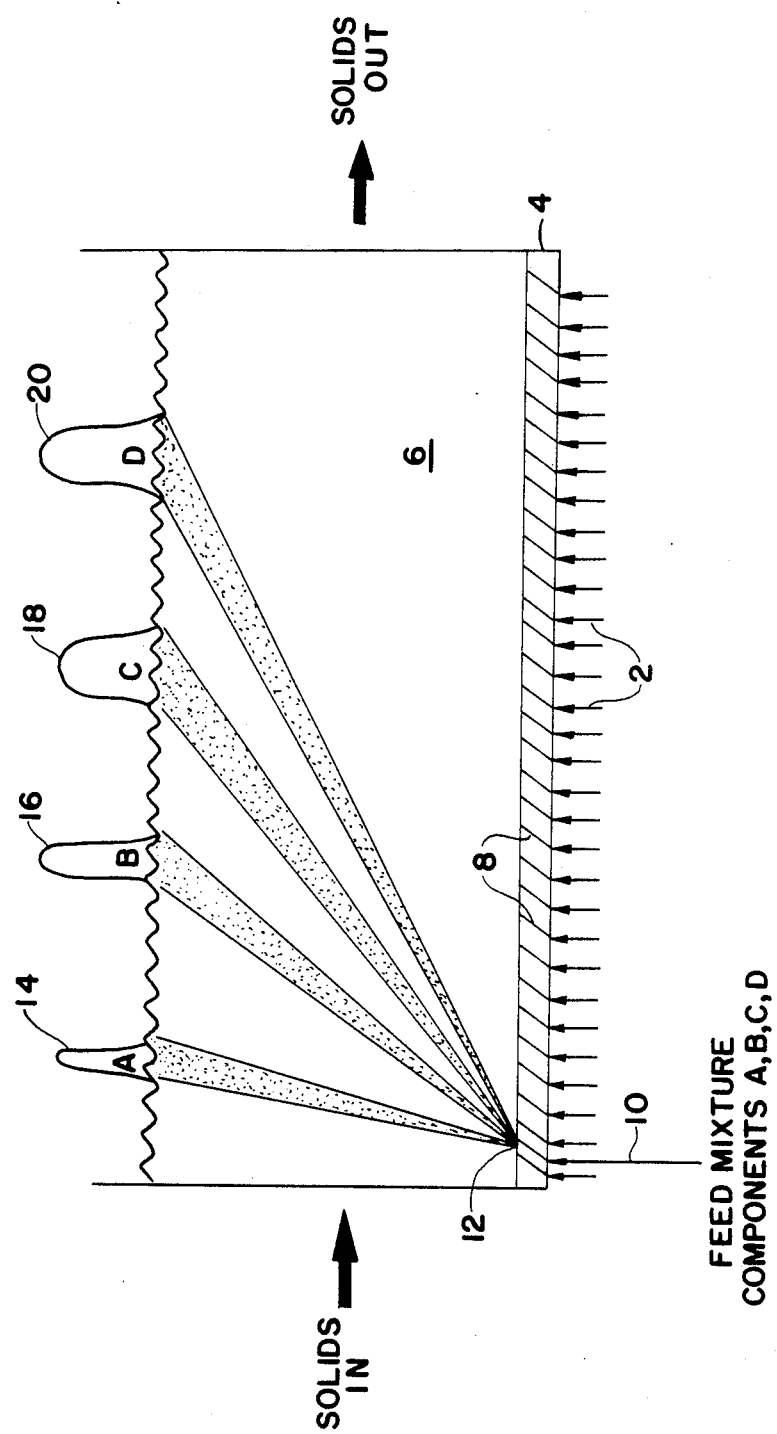
FIG. 1 illustrates the use of a fluid induced transverse flow magnetically stabilized fluidized bed in continuous chromatographic separations.

The present invention relates to a convenient yet simple method of transporting solids in a transverse flow magnetically stabilized bed. More specifically, the fluidizing fluid is introduced into the bed (normally into the lower portion of the bed and preferably through a distribution means which orients the fluid) such that a substantial velocity component of said fluid is in the transverse flow direction; i.e. the direction of solids flow. The transverse momentum of the fluidizing fluid is imparted to at least a portion of the bed solids which causes the transverse flow of the bed. As used herein, substantial or appreciable velocity component refers to the fluidizing fluid entering the bed having a velocity component in the transverse direction sufficient to induce (i.e. to initiate and maintain) transverse flow of at least a portion, preferably a major portion, of said bed solids. Use of this technique reduces or eliminates the costly and inconvenient pneumatic, hydraulic and mechanical transport devices employed in the prior art. In addition, the need to reintroduce large volumes of solid into the bed may also be reduced or eliminated, thereby reducing the magnitude of any gradient in bed depth along the direction of solids flow. Further, solids attrition and erosion of equipment due to transportation are also minimized.

In the present invention, the particles comprising the fluidized stabilized bed are subjected to a magnetic stabilizing means, which serves to stabilize the bed and which may be produced by a variety of methods. For example, the magnetic stabilizing means may be produced internally using permanently magnetized particles (such as are described in U.S. Pat. No. 4,261,101, the entire disclosure of which is incorporated herein by reference) or externally using an applied magnetic field. While the magnetic stabilizing means employed may be either internal or external (with external being preferred), the present invention will be described hereinafter with respect to the use of an externally applied magnetic field, most preferably a uniform applied magnetic field having a substantial component along the direction of an external force field (i.e., gravity).

The magnetically stabilized fluidized bed utilized in the present invention has been described as a quiescent, fluid-like bed which is totally free of bubbles or pulsations and which results when a uniform magnetic field is applied to a bed of magnetizable solids in a direction colinear with the flow of the fluidizing fluid (see Rosenweig, et al, *AIChE Symposium Series*, 77, 205, p. 8–16 (1981), the entire disclosure of which is incorporated herein by reference). As such, magnetic stabilization produces a non-bubbling fluid state having a wide range of operating velocities between a lower limit given by the normal minimum fluidization superficial fluid velocity ($U_{mf}$) required to fluidize or levitate the bed of solids in the absence of the magnetic field, i.e. magnetic effects, and an upper limit given by the superficial fluid velocity ($U_T$) required to cause time-varying fluctuations of pressure difference through the stabilized fluidized bed portion during continuous fluidization in the presence of an applied magnetic field. The bed may also be operated within a narrower range substantially near the locus of transition between the bubbling and stabilized regions of the bed as described for countercurrent beds in U.S. Pat. No. 4,247,987, the entire disclosure of which is incorporated herein by reference, and for transverse flowing beds in copending application Ser. No. 345,094 filed on the same date herewith, such that the fluidity ratio or $(U_T-U_{op})/(U_T-U_{mf})$ ranges between $-0.1$ and $+0.5$ where $U_{op}$ is the actual operating superficial fluid velocity. The fluidity of a magnetically stabilized bed continuously decreases from the fluidity at $U_T$ as the magnetic field is increased above, or the superficial fluid velocity is decreased below, the value as $U_T$.

Magnetically stabilized fluidized beds have the appearance of expanded fixed beds with essentially no gross solids backmixing and essentially no fluid bypassing. The application of the magnetic field allows superficial fluid flow rates of 2, 5, 10 or more times the flow rate of the fluidized bed at incipient fluidization in the absence of the magnetic field, along with the substantial absence of gross solids backmixing and fluid bypassing such as bubbling in gas fluidized beds and roll-cell behavior in liquid fluidized beds. As the superficial fluid velocity is increased, the pressure drop through the bed is similar to that which would be expected from a normal fluidized bed not subjected to an applied magnetic field—the pressure drop increases to a value corresponding to the ratio of bed weight to cross sectional area at the minimum fluidization velocity, and then remains relatively constant as the fluid velocity is increased. This stably fluidized bed condition persists even if the solids are continuously added to or removed from the contacting vessel.

The magnetically stabilized fluidized bed (MSB) thus described combines in one system the principal advantages of both fluidized bed and fixed bed reactor systems as is summarized in Table I below.

TABLE I

|  | Fluid Bed | MSB | Fixed Bed |
| --- | --- | --- | --- |
| Small particle size with low Δ p | yes | yes | no |
| Absence of fluid bypassing | no | yes | yes |
| Continuous solids throughput | yes | yes | no |
| Avoids solids backmixing | no | yes | yes |
| Avoids entrainment from bed | no | yes | yes |

As an example of the advantage of a magnetically stabilized bed, the use of small particle size reduces diffusional resistance within a bed particle such that the particle can be used more effectively. At the same time, both high pressure drop and gross fluid bypassing are eliminated. In addition, since the stabilized fluidized beds are mobile and the bed solids are circulated, continuous reactions with frequent regenerations can be carried out so that catalyst or sorbent activity can be restored following a short cycle.

The bed may contain magnetic and non-magnetic materials. For example, non-magnetic particles may be used as admixtures or as composites with a ferromagnetic or ferrimagnetic substance. All ferromagnetic and ferrimagnetic substances, including, but not limited to, magnetic $Fe_3O_4$, $\gamma$-iron oxide ($Fe_2O_3$), ferrites of the form $MO.Fe_2O_3$, wherein M is a metal or mixture of metals such as Zn, Mn, Cu, etc.; ferromagnetic elements including iron, nickel, cobalt and gadolinium, alloys of ferromagnetic elements, etc., may be used as the magnetizable and fluidizable particulate solids which are used in admixture or composited with the non-magnetic particles. Alternatively the nominally non-magnetic material may itself contain a ferromagnetic or ferrimagnetic substance in its chemical or physical makeup. In this case, the non-magnetic material exhibits magnetic properties. Therefore, no additional magnetic material need be admixed or composited with the non-magnetic material.

The weight fraction of magnetizable component when admixed or composited with the non-magnetic component will vary depending upon process conditions, the particular application of the present invention and the like. Typically, however, the fraction of magnetizable component in the bed will be at least 10 weight percent and, preferably, should range from about 25 to about 75 weight percent.

The bed solids (composites or admixtures) will typically have an average mean particle diameter ranging from about 50 to about 1500 microns. The particles may be of a single size or a mixture of several size ranges. The particles may be of any shape, e.g., spherical, irregular shaped or elongated.

The magnetizable particles (i.e. solids) used in the present invention must have the proper magnetizable properties (and in some instances sorption or catalytic properties). Depending upon the application, a variety of magnetizable particles may be utilized. For non-catalytic operations such as filtering and heat transfer, ferromagnetic solids such as 400 series stainless steels, cobalt, iron and nickel as well as natural ferrites can be used. For catalytic or sorption applications the magnetizable particles may be included in suitable catalyst or sorption particle bases such as silica, alumina or silica-aluminas. A method of preparing magnetizable sorption particles is described in U.S. Pat. No. 4,247,987, the entire disclosure of which is incorporated herein by reference.

For economy, it is desirable that the bed solids achieve sufficient magnetization to stabilize the bed at a relatively small intensity of applied magnetic field. When ferromagnetic particles are placed in the magnetic field, the induced magnetization is a function of the magnetic material, the geometry of the ferromagnetic particle and the geometry of the bed, as is described in U.S. Pat. No. 4,247,987.

Conventional permanent magnets, electromagnets or both can be employed to provide the magnetic field. The electromagnets may be energized by alternating or direct current, although direct current energized magnetic fields are preferred. When powered by direct current with the use of solid state control or a transformer/rectifier, electromagnets are particularly desirable for applying a magnetic field to the bed particles and provide an excellent method of stabilizing the fluidization of the bed particles in response to the flow of the fluidizing fluid.

The invention is not limited by the shape or positioning of the magnet employed to produce an externally applied magnetic field. The magnet can be of any size, or shape and can be placed above or below the bed depending upon the solids used, the degree of stabilization required and the like. The magnets can be placed within or outside the contacting vessel and may even be employed as an integral portion of the vessel structure. The process is not limited to any particular vessel or vessel material and it can be readily adapted for use in contacting vessels currently employed by industry. In a preferred embodiment of the present invention, a solenoid electromagnet is employed to surround the fluidized bed as this provides the most uniform magnetic field and consequently the best stability throughout the bed.

With proper selection of magnetic particles, the power requirement for the electromagnet field source in commercial plants will be modest. Magnet power dissipation generates heat that may be removed using natural convection air cooling. This may eliminate any need for liquid convection cooling and attendant requirements for coolant treatment and recirculation. The magnetic field source may be computer designed with high confidence to yield an applied magnetic field having a specified intensity and uniformity.

The strength of the magnetic field to be applied to the fluidized solids in the contacting zone will depend on the magnetization of the magnetizable particles and the degree of stabilization desired. Particles having relatively weak magnetic properties, e.g., some composites and alloys, will require the application of a stronger magnetic field than particulate solids having strong magnetic properties, e.g., iron, to achieve similar stabilization effects. The size and shape of the solids will also have an effect on the strength of the magnetic field to be employed. The magnetization of the particles should not be sufficient to cause excessive particle to particle attractive forces and agglomeration which would tend to freeze or lock the particles in the bed and prevent continuous operation. However, since the strength of the field produced by an electromagnet depends on the amount of current flowing through the coils of the electromagnet, an operator can readily adjust the field strength to achieve the desired degree of stabilization for the particular system employed. Specific methods of applying the magnetic field are also described in U.S. Pat. Nos. 3,440,731; 3,439,899; 4,115,927 and 4,143,469; British Pat. No. 1,148,513 and in the published literature, e.g., M. V. Filippov, Applied Magnetohydrodynamics, *Trudy Instituta Fizika Akad. Nauk.*, Latviiskoi SSR 12:215-236 (1960); Ivanov et al, *Kinet. Kavel,* 11 (5):1214-1219 (1970) Ivanov et al, *Zhuranal Prikladnoi Khimii*, 45:248-252 (1972); and R. E. Rosensweig, *Science*, 204:57-6 (1979), the entire disclosures of each being incorporated herein by reference. The most preferred applied magnetic field will be a uniform magnetic field such as is described in U.S. Pat. No. 4,115,927. Typically, the applied magnetic field for an empty vessel will range from about 5 to about 1500 Oersteds, preferably from about 10 to about 1000 Oersteds.

The present invention can take place in any suitable vessel or contacting zone. The vessel may be equipped with internal supports, trays, etc. Preferably there will be disposed in the lower portion of the vessel a distribution means which supports the bed and distributes the incoming fluidizing fluid, which may be gaseous or liquid. The particular distribution means employed is not critical provided it can orient at least a portion of the fluidizing fluid in the direction of bed solids flow; i.e., the fluid (normally the fluid in the lower portion of the bed adjacent to the distribution means) will enter the bed having a velocity component in the direction of desired bed solids flow and transverse to the flow of the fluidizing fluid exiting the bed. The orientation may be obtained using a distribution means containing holes or perforations, alone or in combination with nozzles or louvers, slanted in the direction of desired solids flow. Normally, such slanted propulsion passages will be arranged in rows, offset and staggered to ensure a uniform distribution of fluidizing fluid in the bed. However, the actual spacing of the holes and their size and shape will vary depending upon the type of solids in the bed, the velocity of the fluidizing fluid and the like. If desired, the propulsion passages may extend into the bed, being placed on top of the grid or porous plate.

The angle at which the propulsion passages are slanted can vary broadly depending on process parameters such as the particular solids and fluidizing fluid employed, the solids flow velocity, the strength of the magnetic field and the like. Normally, however, the propulsion passages will be slanted at an angle between about 5° and about 85° relative to the vertical in the direction of solids flow.

The fluidizing fluid which enters the bed will have horizontal and vertical components of velocity. However, while all of the fluid serves to fluidize the bed, only that portion of the fluid having a horizontal component of velocity contributes to initiating and maintaining the transverse flow of solids in said bed.

The operating conditions employed in the present invention may vary broadly depending upon the particular application. Temperatures will range from ambient, or lower, to the Curie temperature of the magnetic component within the bed, and pressures will range from about 1 to about 10,000 psia. In general, the contact time of the fluidizing fluid with the solids comprising the bed need only be sufficient to initiate and maintain flow in at least a portion of said bed. The superficial velocity of the fluidizing fluid will range between $U_{mf}$ and $U_T$ and will vary depending on the type of solids in the bed, the inclination of the distribution means, the geometry of the vessel and the like. Normally, however, the superficial fluid velocity will range from about 0.0001 to about 5 m/sec. Liquid phase superficial fluid velocities will range typically from 0.0001 to about 0.1 m/sec. while gas phase superficial fluid velocities will range from about 0.001 to 5 m/sec. Similarly, the solids transverse flow velocity can vary broadly depending upon the velocity of the fluidizing fluid, the geometry of the vessel, the solids being fluidized and other operating parameters. Generally, however, the solids velocity will range from about 0.001 to about 20 cm/sec.

The present invention can be utilized alone or in combination with a variety of operations including, but not limited to, fluid operations (e.g., drying, acid gas removal, selective adsorption or absorption of a constituent, solids/solids separations and chromatographic separations), heating and cooling of fluids using the heat capacity of the solids, particulate removal from gases, droplet and haze removal from gases and thermal as well as catalytic conversion of solids and fluids. Thus, using the present invention, a catalytic process can be combined with selective removal of one of the reaction products, or particulate removal can be combined with gas-to-gas heat exchange as well as gas desulfurization. This invention can also be used to transport solids from one vessel to another, or from one side of a single vessel to another side of the same vessel, or for producing transverse flow in a magnetically stabilized fluidized solids bed within which particulates capture, solids/solids separation, chemical reaction, chromatographic separation and the like occur in the same zone or in separate zones.

A specific application of the present invention involves the continuous chromatographic separation of a multicomponent feed as is described in U.S. Pat. No. 4,443,231 filed on the same date herewith. As illustrated in FIG. 1, a vertically flowing fluidizing fluid 2 (i.e., carrier fluid) passes continuously through a distribution means 4 and fluidizes a magnetically stabilized bed 6 containing solid adsorbents that flow transverse to the flow of the fluidizing fluid exiting the bed. The distribution means 4 contains slanted propulsion passages 8 that serve to orient at least a portion of the incoming fluidizing fluid in the direction of solids flow. Thus the fluidizing fluid (which comprises the eluent) will enter the bed having a velocity component transverse (perpendicular in FIG. 1) to the flow of the fluidizing fluid exiting the upper surface of the bed, thereby causing transverse flow of the bed solids. A feed mixture 10 having at least two components (four components A-D are shown in FIG. 1) is introduced into bed 6 at injection point 12 and contacts the adsorbent therein for a period of time necessary to separate at least a portion of one of said components from said mixture. Each component of the mixture has different adsorption-desorption characteristics with respect to the bed solids. In this illustration, component A is least strongly adsorbed by the bed solids while components B, C and D are more strongly adsorbed. Each component moves through the bed due to the upward flow of the fluidizing fluid and the transverse flow of bed solids. Thus, each component has a velocity vector in two directions—one is in the direction of solids movement due to adsorption thereon while the other is in the direction of the fluidizing fluid toward the upper surface of the bed due to desorption of the components from the solids. The point at which a particular component and a portion of the fluidizing fluid exit from the upper surface of the bed depends upon several factors including the transverse flow velocity of the bed solids, the velocity of the fluidizing fluid and the adsorption-desorption characteristics of the bed solids. For example the weakest adsorbed component (component A) is not transported significantly by the moving solids and exits from the upper surface of the bed close to the feed injection point at location 14. The more strongly adsorbed components (components B, C and D) pass further downstream with the adsorbent solid and, consequently, exit from the upper surface of the bed further from the feed injection point at locations 16, 18 and 20. Components A through D can then be recovered from the upper surface of the bed at different distances downstream from the injection point along the path or flow direction of said bed. In a broad embodiment, at least one product stream will be recovered from said transverse flowing bed along the path of said bed, said product stream comprising a portion of the fluidizing fluid and a portion of the feed mixture containing at least a portion of one of said components.

The present invention can also be applied to separate a mixture comprising non-magnetic particles having different densities by adjusting the specific gravity of the bed as is disclosed in copending application Ser. No. 345,049 filed on the same date herewith. As disclosed therein, a mixture comprising non-magnetic solids having different densities is introduced into a transverse flow magnetically stabilized bed. Solids which are more dense than the bed medium ideally tend to sink in the bed while solids which are lighter than the bed medium tend to float on the surface of the bed. Since two or more different density fractions may be recovered according to this process, the bed should be stabilized to eliminate solids remixing. In addition, the process should be operated at increased bed fluidity to facilitate movement of the solids and promote rapid separation.

The present invention may be utilized in a variety of configurations. For example, in the embodiment illustrated in FIG. 1, the bed solids move horizontally across a distributor grid having holes slanted in the direction of desired solids flow. The jet action of the fluidizing fluid passing through the holes provides the necessary momentum to transport the solids across the plate without the need for a gradient in bed height.

Figure 2A:
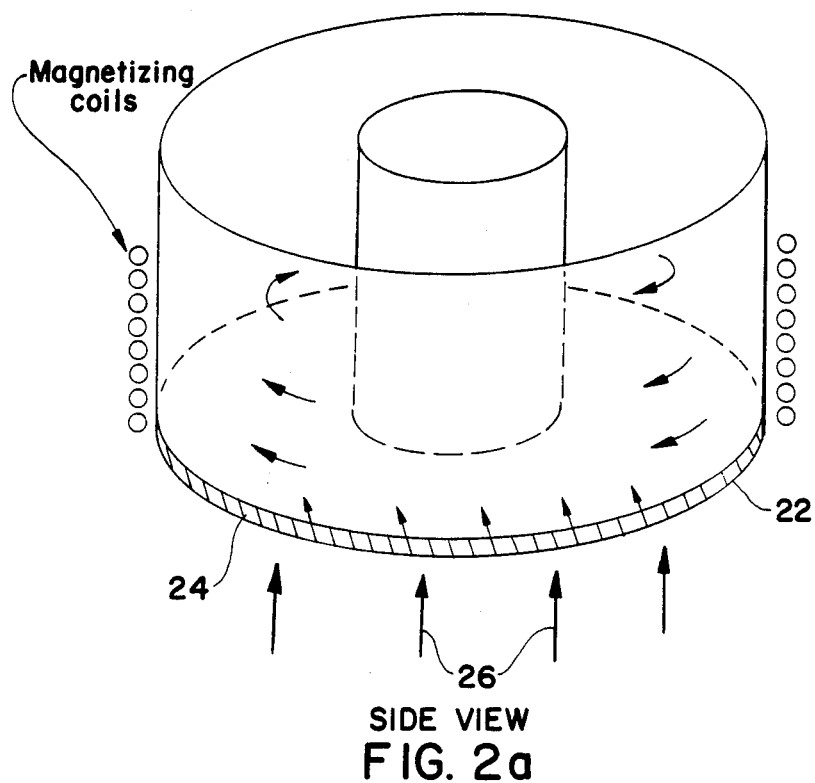
FIG. 2 illustrates the use of fluidizing fluid to induce solids transport in a rotating transverse flow magnetically stabilized fluidized bed.
Figure 2B:
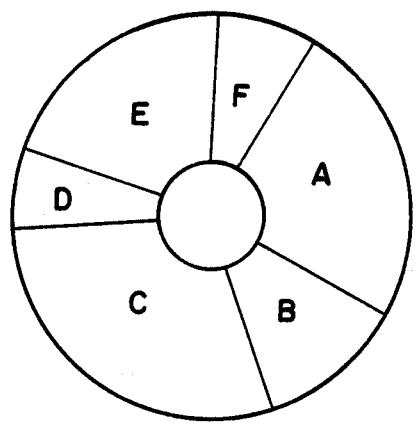

In another embodiment, the contacting vessel or zone is closed (i.e. no solids are removed from the vessel) such that the solids circulate essentially in the same direction in a closed loop within said vessel (i.e. the flow path of the solids starts and ends at the same point). While the flow path of the solids is not limited to any particular configuration (e.g. circular, rectangular, etc.), one configuration is shown in FIG. 2a wherein a distributor grid 22 having slanted propulsion passages 24 through which fluidizing fluid 26 passes is arranged in the shape of a flat annulus such that the magnetically stabilized fluidized bed of solids rotates uniformly in a circle (i.e. like a carousel) as shown by the arrows. If desired, the annular grid can be subdivided into a number of sections A-F as shown in FIG. 2b such that a different fluidizing fluid or a fluid at different conditions can be introduced into the bed through the different sections. Accordingly, the magnetically stabilized bed of solids rotating above the grid will be exposed sequentially to the different fluid streams. In this configuration the zone above the bed can be segmented as the grid, but radially displaced somewhat to allow for bed rotation, thereby permitting segregated withdrawal of the product streams from the various sections which correspond to the different grid segments.

It may be desirable to introduce, for example, inert purge gases into alternate sections of the grid, such as sections B, D, and F shown in FIG. 2b so as to minimize mixing of the gases, introduced through sections A, C, or E. In this configuration, the vapor space above the bed should be segmented into only three sections, corresponding to A, C, and E, with the purge gases being collected in the A, C, and E product sections.

Figure 3A:
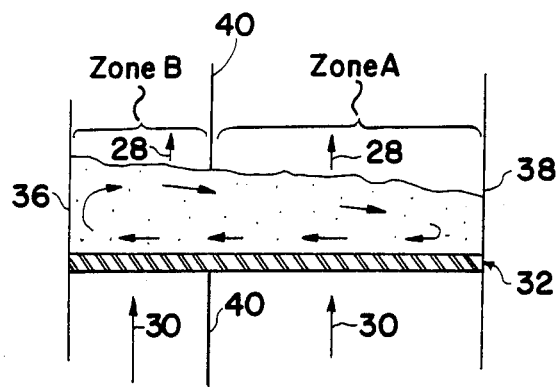
FIG. 3 illustrates the use of fluidizing fluid to induce self circulation of solids in a transverse flow magnetically stabilized fluidized bed.
Figure 3B:
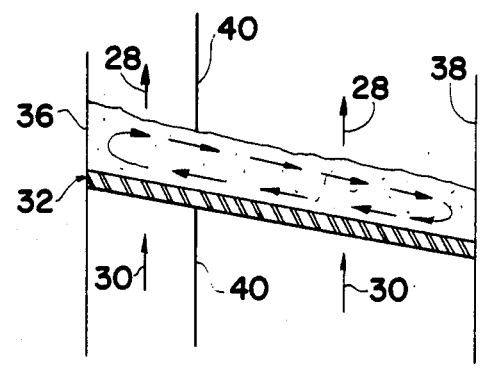
Figure 3C:
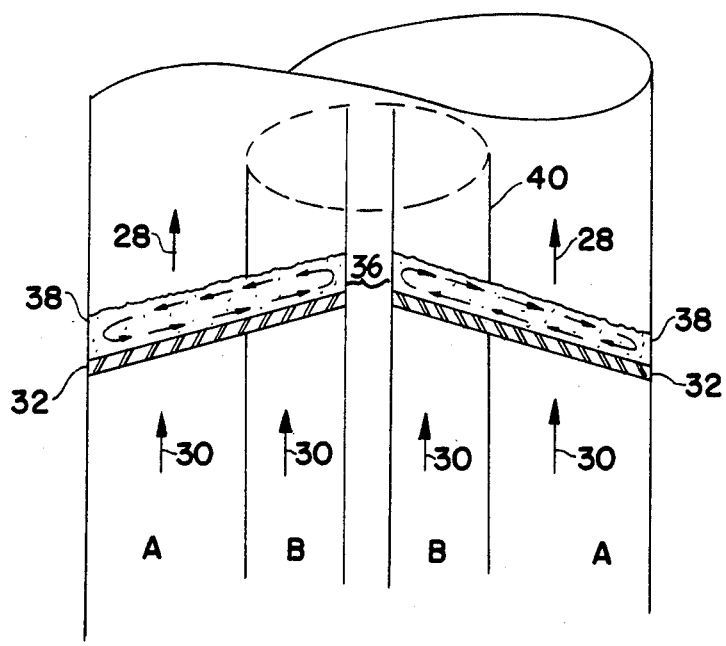

FIGS. 3a-c show yet another embodiment of the present invention in which a bed comprising an essentially fixed (or constant) inventory of solids (or particles) is circulated within a contacting vessel such that the upper portion of the bed moves in a direction essentially opposite to that of the lower portion. As shown therein, circulation of the bed of solids is effected by inducing the lower portion of said bed to move transverse to the direction of flow of the fluidizing fluid 28 exiting the bed by passing the fluidizing fluid 30 entering the bed through a distributor grid 32 having jets or propulsion passages 34 slanted in the direction of desired solids flow. The solids then contact and are deflected by one boundary of the contacting vessel 36 (also meant to include a boundary within vessel 36 such as a baffle) such that the upper portion of said bed will flow in a direction essentially opposite to the motion of the lower portion of the bed. The reverse flowing upper portion of the bed contacts and is deflected by the opposite boundary 38 of the vessel (also meant to include another boundary within the vessel such as a baffle) such that said upper portion becomes said lower portion of said bed. The arrows in FIGS. 3a-c illustrate the self-circulation of the bed within a closed loop thus described.

As used herein, the expressions "essentially opposite (or reverse) direction" or "direction essentially opposite (or reverse)" refer to one portion (or layer) of the bed moving in a direction opposite to that of another layer (or portion) of said bed; i.e. layers that are essentially mirror images moving in opposite directions. The direction of one layer may or may not be parallel to the direction of the other layer. The expression "essentially fixed or constant inventory of the solids" refers to maintaining essentially the same amount of solids in the separating medium by adding fresh solids to replace those removed with the product streams. Addition of fresh solids may be continuous or periodic to allow for variations in the solids inventory in the contacting vessel.

When grid 32 is horizontal as shown in FIG. 3a, the reverse movement results from the gradient in bed height established by the flow of the lower portion of the bed. Thus, in this configuration, the total bed height is not uniform across the grid. When the grid is inclined, as shown in FIG. 3b, the fluidizing fluid passing through the slanted jets transports the solids in the lower portion of the bed up the incline while the solids in the upper portion of the bed flow downward due to gravity. In this configuration, flows can be adjusted such that the bed height across the grid is essentially uniform, i.e., essentially no gradient in bed height. For the radial flow bed shown in FIG. 3c, the flow of solids will be radially inward at the lower portion and radially outward at the upper portion of the bed.

As shown in FIGS. 3a-c, the magnetically stabilized fluidized bed may be divided into two or more zones by baffles 40 below as well as above the grid 32, enough clearance being provided to allow for unimpeded passage of the bed solids. Purge zones can be interposed to prevent undesirable contamination. In FIG. 3a and 3b, the baffles 40 are straight across the plate, while in FIG. 3c the baffles 40 are circular and separate an inner cylindrical region from an outer annular section. Use of a fluid induced self-circulating magnetically stabilized fluidized bed permits the flow of solids from zone A to zone B and back to zone A without lift-lines, stand-pipes and cyclones. As such entrainment and attrition of the solids are minimized.

The self-circulating bed configuration shown in FIG. 3a, for example, may be used in a variety of applications, some of which are enumerated below:

(a) Catalytic reaction (in zone A for example) and continuous regeneration or catalyst reconditioning (in zone B).
(b) A chemical reaction in zone A followed by solid regeneration in zone B; e.g. $SO_2$ removal in zone A by chemical reaction of the solid ($CuO$ or $CeO_2$) with $SO_2$ followed by regeneration with a reducing fluid or $H_2$ in zone B.

(c) Adsorption (e.g. drying) in zone A followed by desorption in zone B.

(d) Heat exchange between fluid streams in zone A and in zone B using the circulating solid as a heat carrier.

(e) Particulate removal from the fluid in zone A followed by removal of these particulates (e.g. elutriation) from the circulating solids in zone B.

In another embodiment (not illustrated), a portion of the bed is provided with a conventional grid whereby the fluidizing fluid is introduced in the conventional manner (vertical or perpendicular to the grid). In FIG. 3a, this could be zone B. In yet another embodiment (also not illustrated), a portion of the contacting zone need not be magnetically stabilized, i.e., ordinary fluidization with fluid bypassing, bed solids backmixing and fines elutriation will occur in this zone. A particularly preferred application of the above embodiments, alone or in combination, is the removal of fines or particulates from a fluid stream. Using FIG. 3a to illustrate the second embodiment, a fluid stream containing particulates is introduced into zone A (which is magnetically stabilized) wherein said particulates are captured therein. The captured particulates then circulate into zone B (which is not magnetically stabilized) and are removed therefrom by elutriation.

The present invention will be futher understood by reference to the following examples which are not intended to restrict the scope of the claims appended hereto.

EXAMPLE 1

Figure 4A:
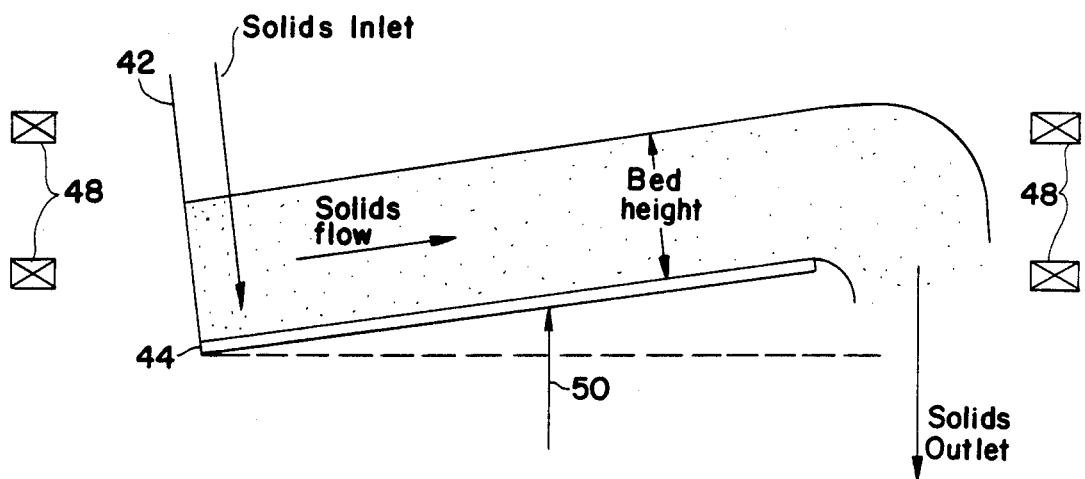
FIG. 4 illustrates an experimental apparatus employed to study the transport of solids in a fluid induced transverse flow magnetically stabilized fluidized bed.
Figure 4B:
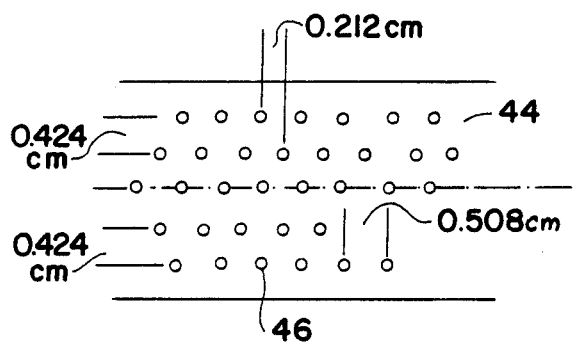
Figure 4C:
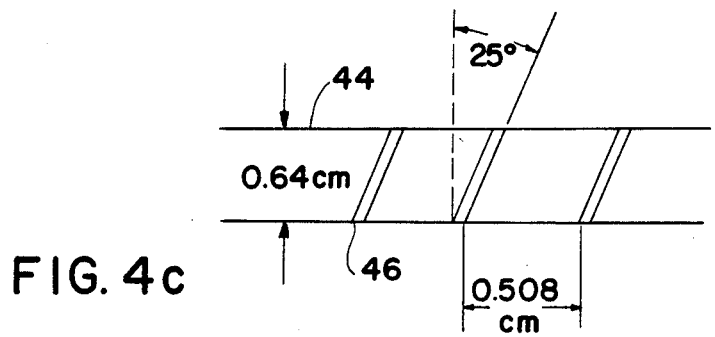

Composite particles of 70 wt.% stainless steel and 30 wt.% alumina were placed in a MSB unit 42 2.54 cm wide and 68.6 cm long as shown in FIG. 4a. The particles had an average particle size of 1300 microns and a density of 2.9 g/cc. The lower part of the unit contained a 0.64 cm thick aluminum distributor grid 44 perforated with holes 46, each hole being 0.061 cm in diameter and slanted 25° to the vertical in the direction of desired solids flow. The holes were arranged in rows 0.424 cm apart with one-half (i.e. 0.212 cm) spacing offset (bricklayer fashion). The centerline of the holes in each row was spaced 0.508 cm from the centerline of adjacent holes. Top and side views of the grid are shown in FIGS. 4b and 4c, respectively. The entire unit was placed in a vertical magnetic field supplied by two solenoidal electromagnets 48 connected in parallel, placed one above the other 15.5 cm apart, each made of 700 turns of #14 enameled cooper wire. The magnets were elliptical in design with inside dimensions of 22 cm by 94.5 cm. Continuous solids throughput was achieved by removing solids from the outlet of the bed and pneumatically conveying them to the inlet.

The distributor grid 44 was tilted at an angle of 2.89° such that the solids outlet was higher than the solids inlet. Fluidizing air 50 was passed through the grid at a superficial velocity of about 96 cm/sec and the magnetic field was set at about 103.5 Oersted. The bed particles were visually observed to move up the inclined distributor against gravity, with an average bed height of 1.72 cm. In addition, the surface of the bed was inclined an additional 0.9° with respect to the distributor grid in the direction of solids flow, or a total of 3.79° with respect to the horizontal in the direction of solids flow.

The example shows that the air not only fluidized the bed but also provided the means to transport the particles in the bed upward against the solids gradient.

EXAMPLE 2

Figure 5:
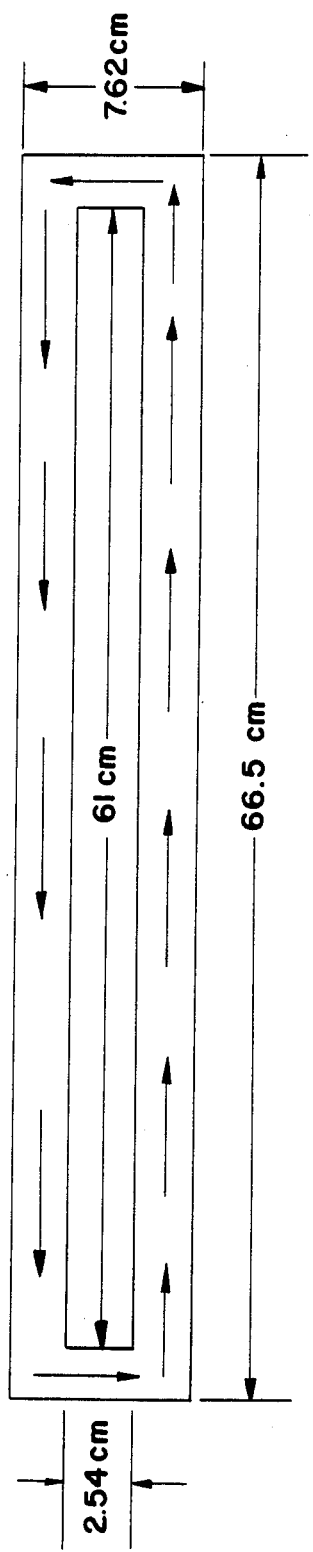
FIG. 5 illustrates an experimental apparatus employed to study the transport of solids in a fluid induced transverse flow magnetically stabilized fluidized bed.

The stainless steel/alumina composites of Example 1 were placed in a rectangular unit 66.5 cm long and 7.62 cm wide as illustrated in FIG. 5. The unit enclosed a rectangular center spacer 61 cm long and 2.54 cm wide such that the flow channel for the moving bed was about 2.54 cm wide. The unit was surrounded by the solenoidal magnets of Example 1 and the bed was fluidized by passing air through a grid having the same specifications as that used in Example 1.

Bed height was measured visually and the solids horizontal velocity at the top surface of the bed was determined by measuring the linear speed of a cork floating on the surface of the bed. The experiment was repeated with −20 +30 U.S. sieve steel spheres. The results from both experiments are shown in Table 2 below:

TABLE 2

| Solids | Gas Superficial Velocity, cm/sec | Magnetic Field, Oersted | Bed Height, cm | Solids Horizontal Velocity, cm/sec |
|---|---|---|---|---|
| SS/Alumina | 86.4 | 64.7 | 1.27–1.91 | 2.0 |
| Composite | 89.3 | 70.6 | 1.27–1.91 | 6.4 |
| Steel Spheres | 109.4 | 23.52 | 1.27 | 7.87 |
| | 117.9 | 29.4 | 1.27 | 10.49 |

This example demonstrates that the fluidizing fluid can be used to induce and maintain solids circulation (as shown by the arrows in FIG. 5) in a transverse flow magnetically stabilized bed while maintaining relatively stable bed height.

EXAMPLE 3

Figure 6:
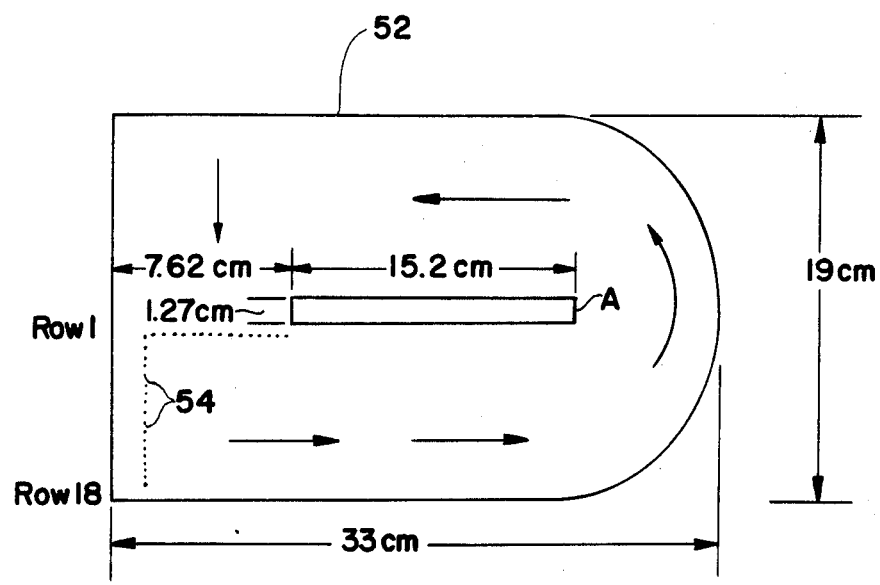
FIG. 6 illustrates an experimental apparatus employed to study the transport of solids in a fluid induced transverse flow magnetically stabilized fluidized bed.

Several experiments were performed in a carousel-type magnetically stabilized bed in which composites of 70 wt.% stainless steel and 30 wt.% alumina were circulated horizontally over a distributor grid 52 having 18 rows of grid holes 54. A top view of the grid showing the direction of solids flow (as shown by the arrows) is illustrated in FIG. 6. Grid 52 and holes 54 have the same arrangement and dimensions as the grid shown in FIGS. 4b and 4c except that the semicircle portion has grid holes spaced as follows (as measured from point A):

| Row | Angle Between Holes | Radii, cm |
|---|---|---|
| 1 | 30° 55' | 0.848 |
| 2 | 21° 46' | 1.273 |
| 3 | 16° 40' | 1.697 |
| 4 | 13° 28' | 2.121 |
| 5 | 11° 17' | 2.545 |
| 6 | 9° 43' | 2.969 |
| 7 | 8° 31' | 3.393 |
| 8 | 7° 35' | 3.818 |
| 9 | 6° 50' | 4.242 |
| 10 | 6° 13' | 4.666 |
| 11 | 5° 42' | 5.09 |
| 12 | 5° 16' | 5.514 |
| 13 | 4° 53' | 5.938 |
| 14 | 4° 34' | 6.363 |
| 15 | 4° 17' | 6.787 |
| 16 | 4° 2' | 7.211 |

-continued

| Row | Angle Between Holes | Radii, cm |
| --- | --- | --- |
| 17 | 3° 49' | 7.635 |
| 18 | 3° 36' | 8.059 |

The circulating bed is retained by Plexiglas walls.

Two solenoidal electromagnets connected in series and placed one above the other 15.5 cm apart surround the entire unit. Each electromagnet is elliptical in design, made of 508 turns of #8 enamelled copper wire and has inside dimensions of 30 cm × 105 cm.

In each experiment, air was introduced through the grid to fluidize the bed in the absence of a magnetic field. As the flow of air increased, the bed began to bubble at the minimum fluidization velocity. Some horizontal movement of solids across the grid was also observed. This was due to the transfer of kinetic energy from the fluidizing gas which has a velocity component in the direction of solids flow due to the slant of the grid holes. As the air velocity was increased further, violent bubbling occurred throughout the bed making it difficult to determine if the solids were still being moved by the incoming air. As the magnetic field was applied and increased, the solids motion became more orderly and the horizontal movement of solids around the unit was observed. When the bed was stabilized, the solids appeared to move uniformly, decreasing in velocity as the magnetic field was increased. The solids velocity was measured visually be determining the time necessary for the solids to move a fixed distance along one of the straight sections. Similar measurements were made at several positions along the width of the flow channel to obtain the solids flow profile.

Figure 7A:
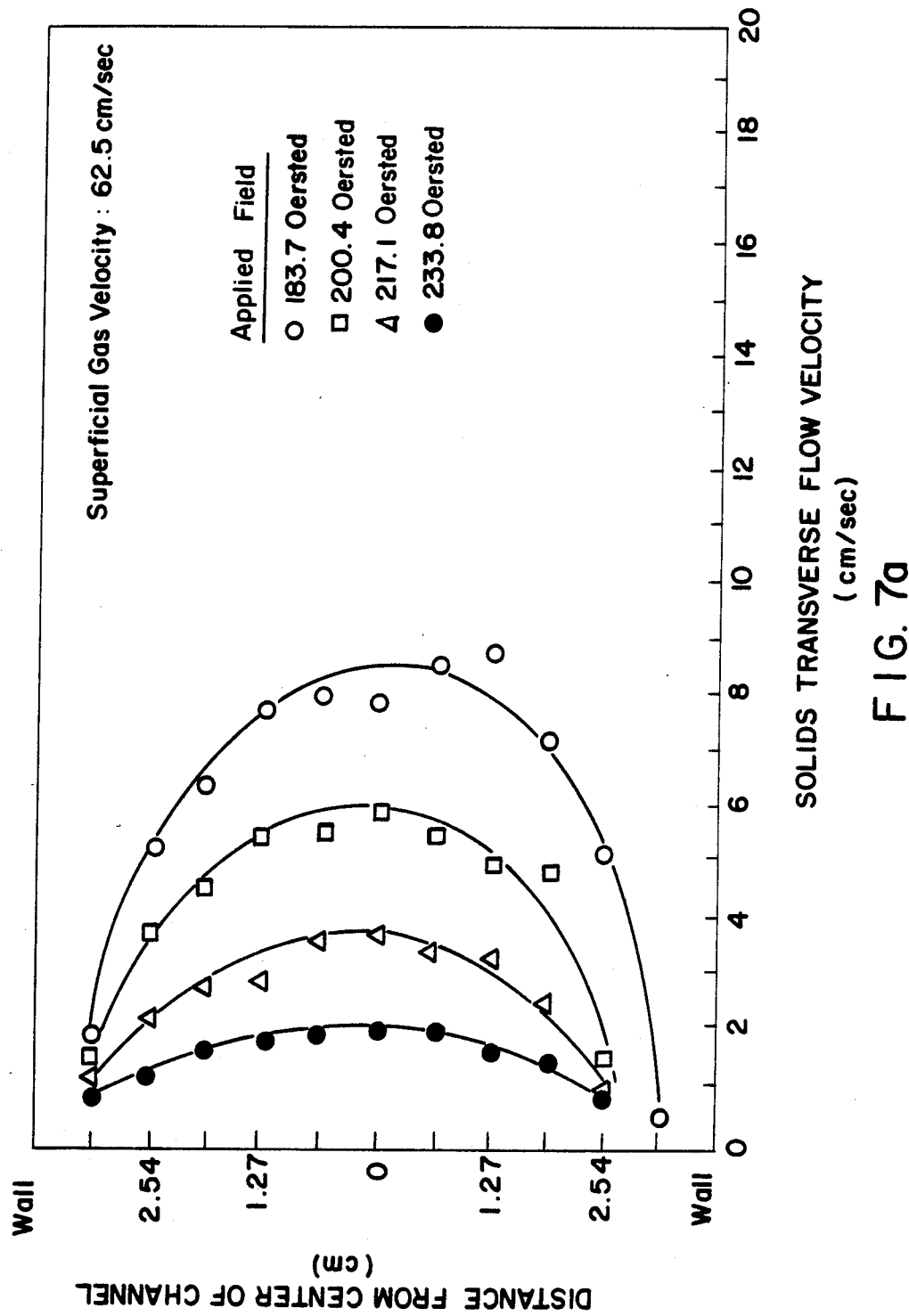
FIGS. 7a and 7b illustrate the effect of magnetic field on solids flow pattern in a fluid induced transverse flow magnetically stabilized fluidized bed.
Figure 7B:
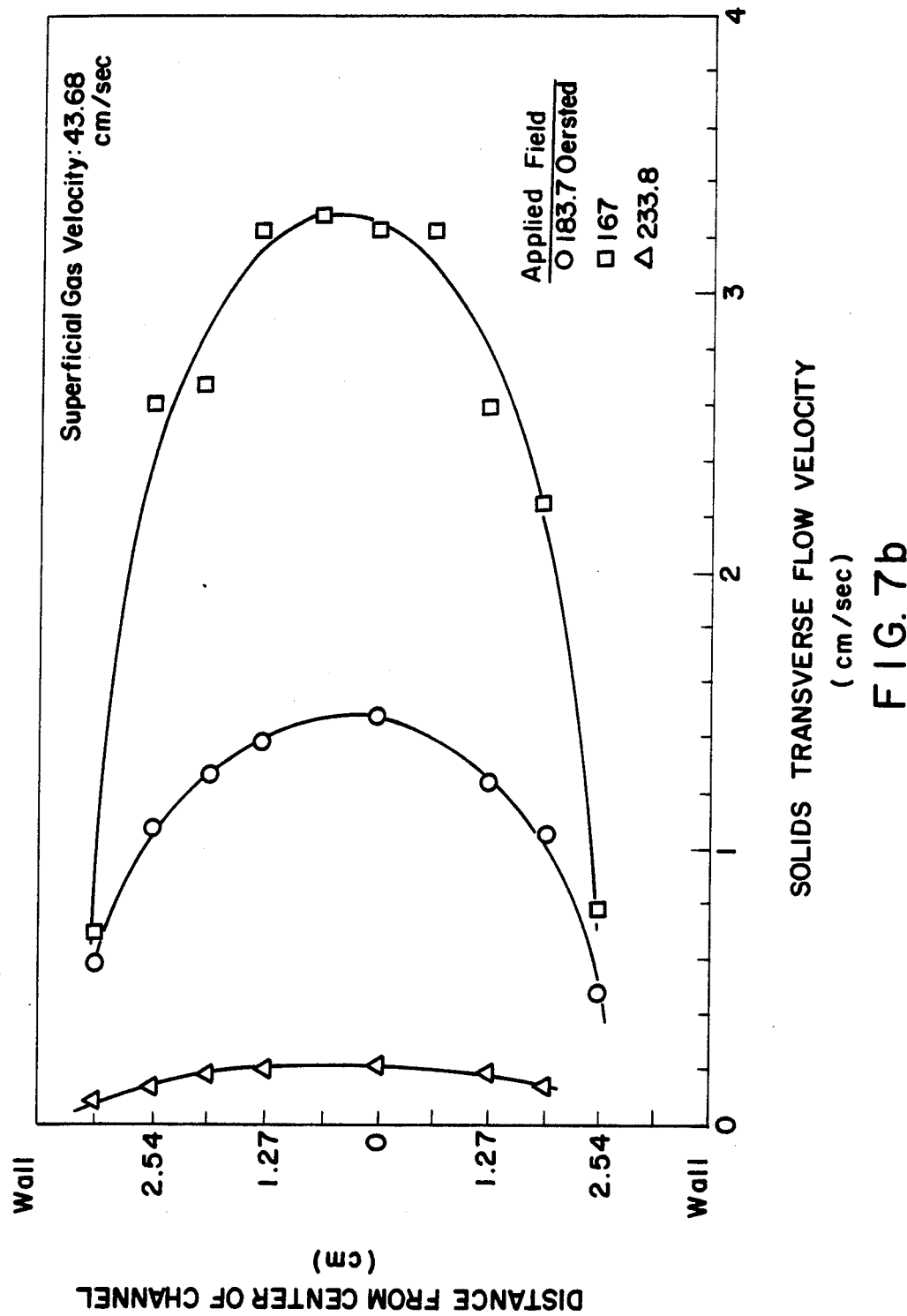

FIGS. 7a and 7b illustrate the effect of magnetic field on solids flow pattern at contant fluidizing air velocity for −20 +25 and −30 ±35 U.S. Sieve composites, respectively. As shown therein, the solids velocity profiles maintain similar shape while the average solids velocity decreases with increasing magnetic field.

Figure 8A:
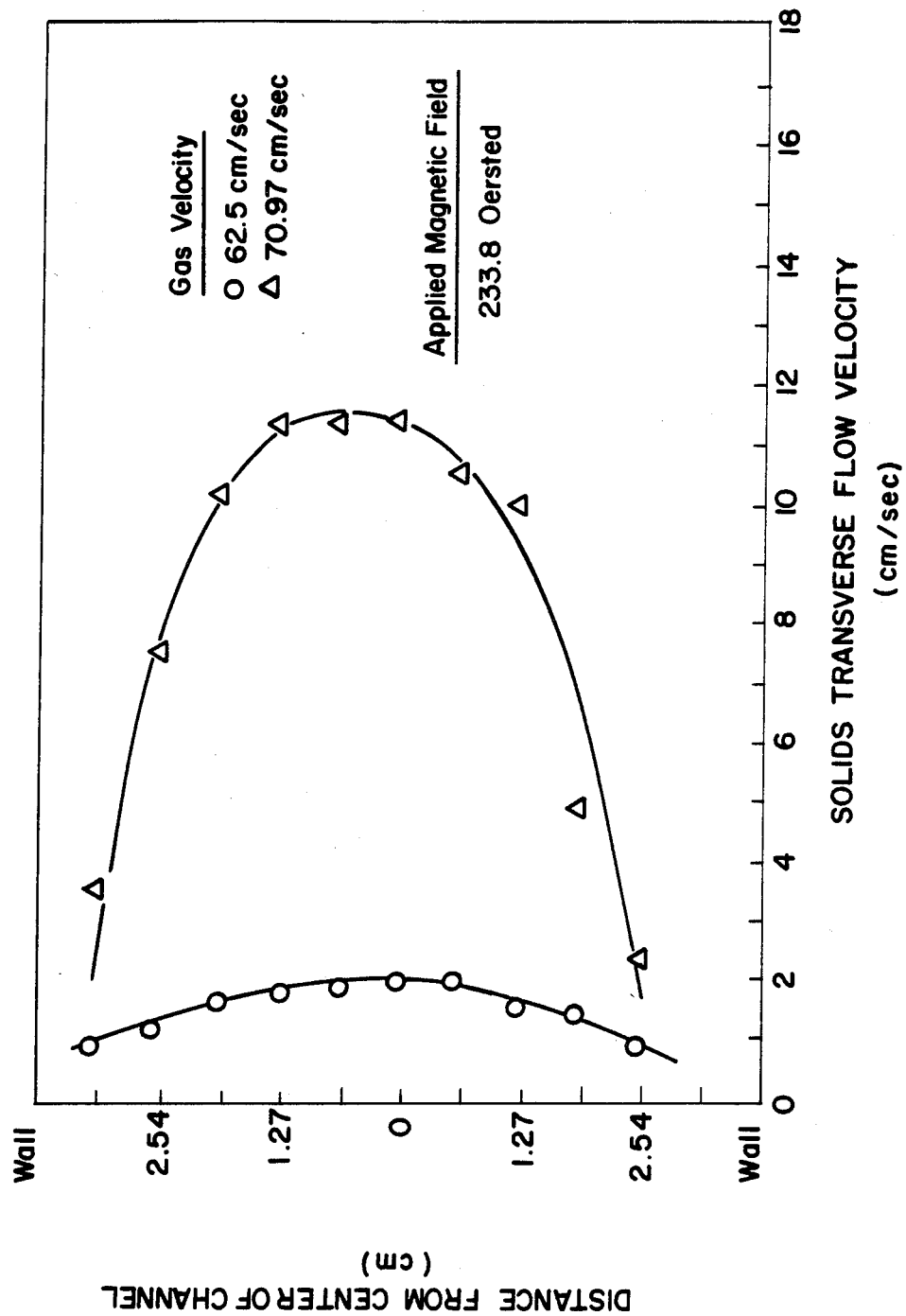
FIGS. 8a and 8b illustrate the effect of superficial gas velocity on solids flow pattern in a fluid induced transverse flow magnetically stabilized fluidized bed.
Figure 8B:
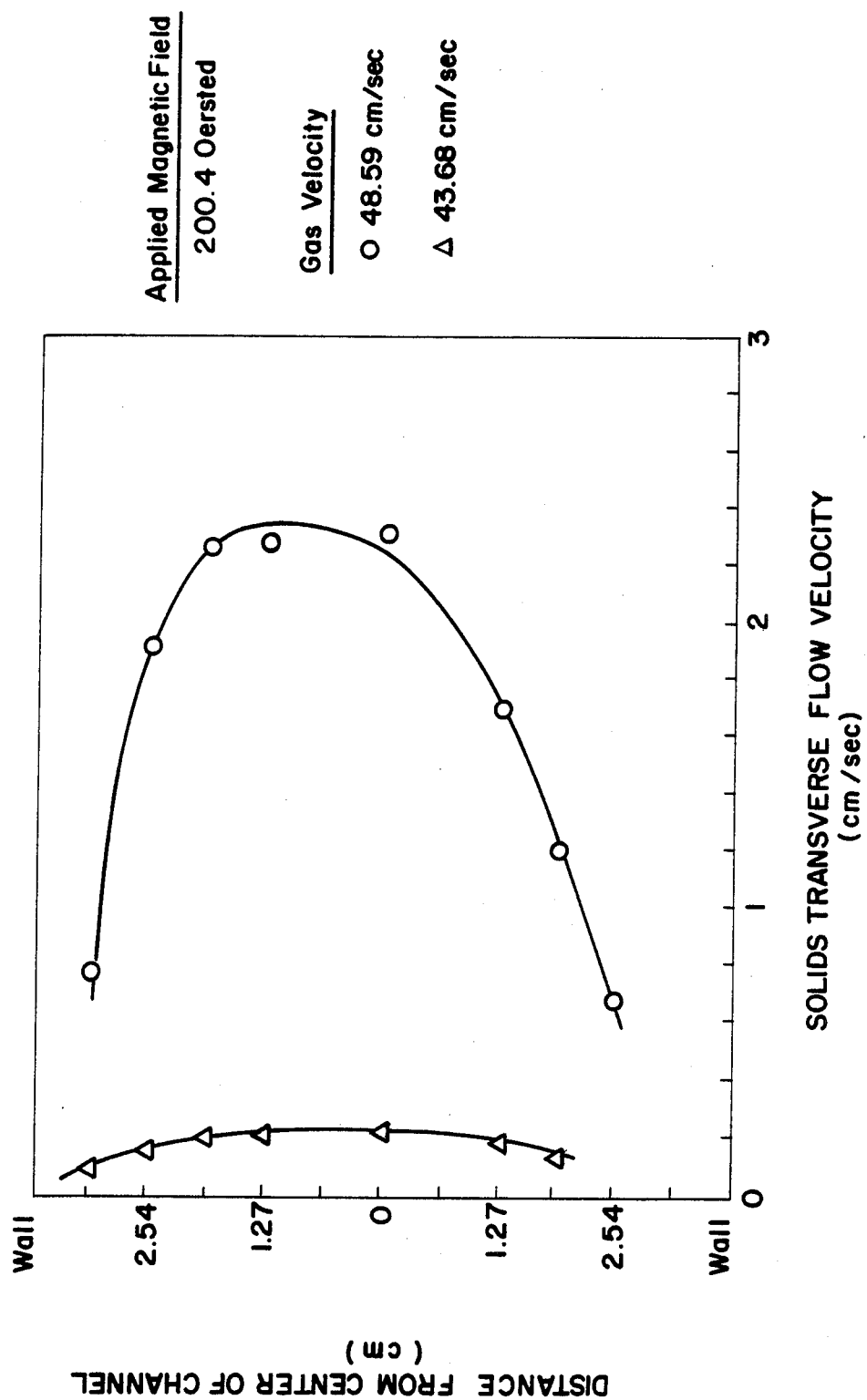

FIGS. 8a and 8b illustrate the effect of superficial gas velocity on solids flow pattern at constant magnetic field for −20 +25 and −30 +35 U.S. Sieve composites, respectively. As shown therein, the solids velocity increases with higher superficial gas velocities.

Figure 9:
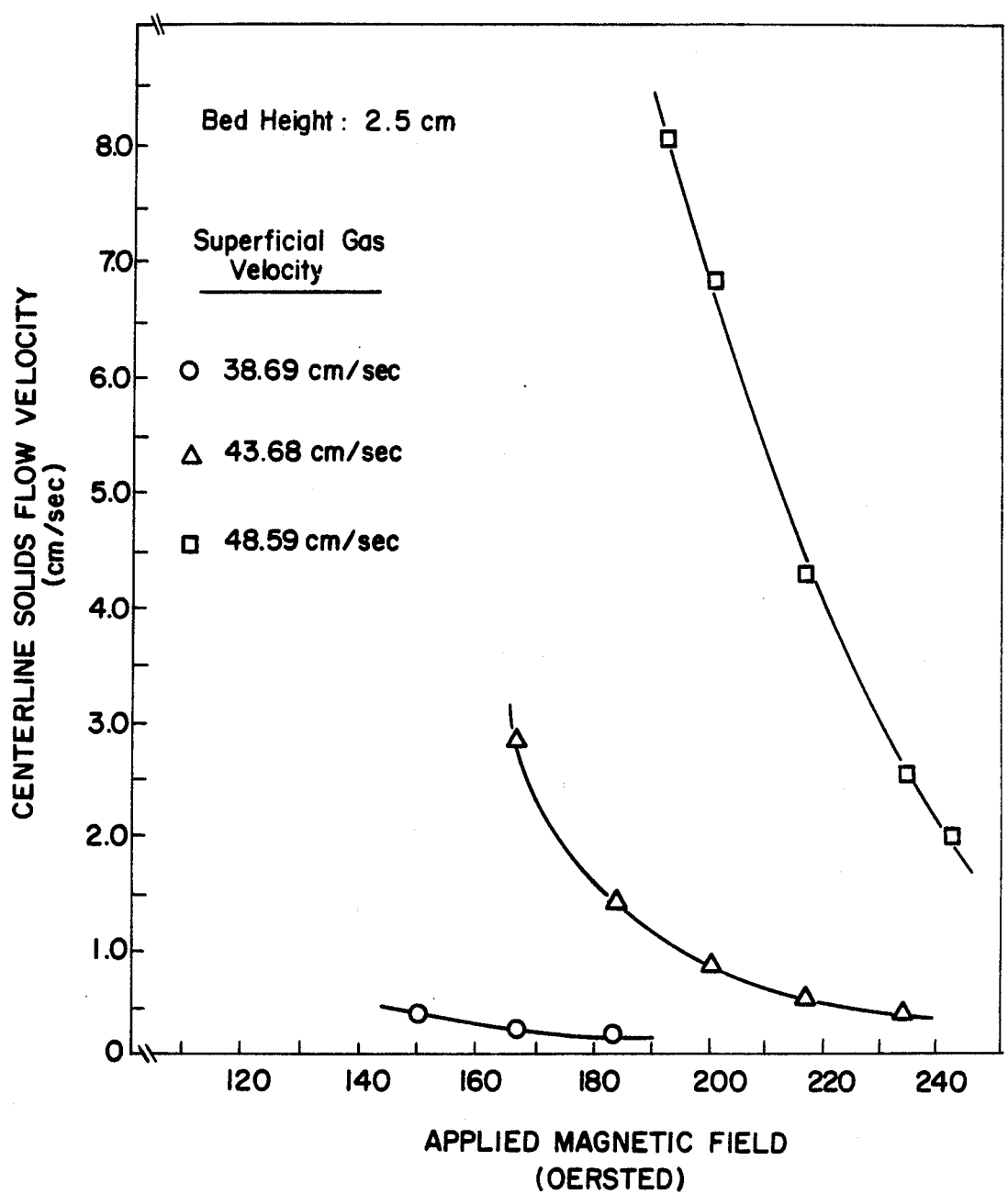
FIG. 9 illustrates the effect of magnetic field and gas velocity on solids flow rate in a fluid induced transverse flow magnetically stabilized fluidized bed.

FIG. 9 shows the combined effects of magnetic field and superficial gas velocity on solids flowrate for −30 +35 U.S. Sieve composites. Thus, the solids are transported more rapidly at increased velocity of the fluidizing fluid and decreased strength of the magnetic field. Both parameters, therefore can be used to control the solids flow rate.

Figure 10:
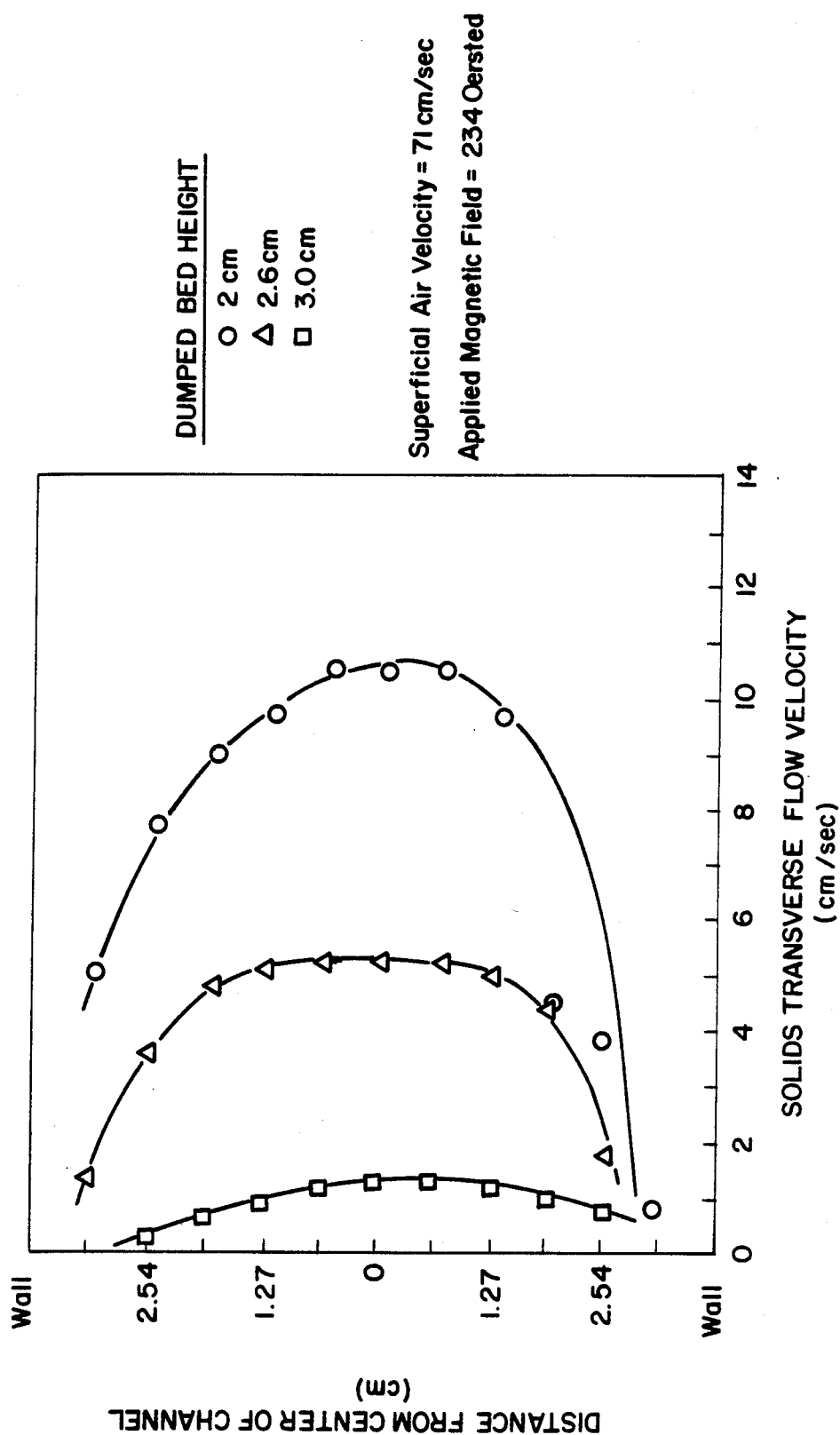
FIG. 10 illustrates the effect of bed height on solids flow pattern in a fluid induced transverse flow magnetically stabilized fluidized bed.

FIG. 10 illustrates the effect of bed height on solids flow pattern at the top surface of the bed at constant fluidizing air velocity and magnetic field for −20 +25 U.S. Sieve composites. As shown therein, the solids velocity at the surface decreased with increasing dumped bed height. As used herein, dumped bed height refers to the initial depth of solids prior to introducing the fluidizing fluid into the bed.

Figure 11:
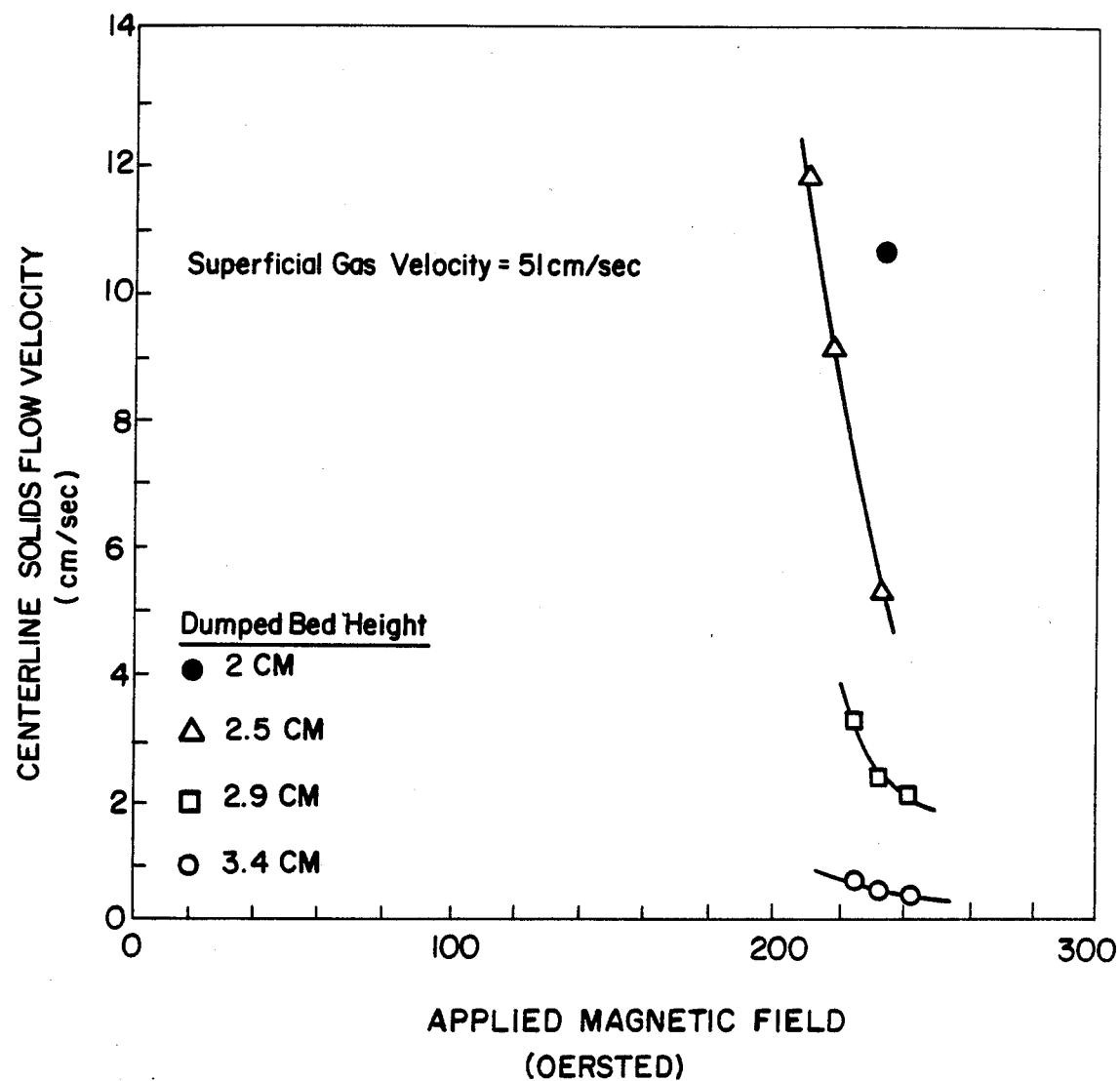
FIG. 11 illustrates the effect of magnetic field and bed height on solids flow rate in a fluid induced transverse flow magnetically stabilized fluidized bed.

The combined effects of magnetic field and dumped bed height on solids flowrates at constant fluidizing gas velocity for −30 +35 U.S. Sive compositions is shown in FIG. 11. As illustrated therein, the greater the initial bed height, the lower the solids velocity at the upper surface of the bed.

Figure 12:
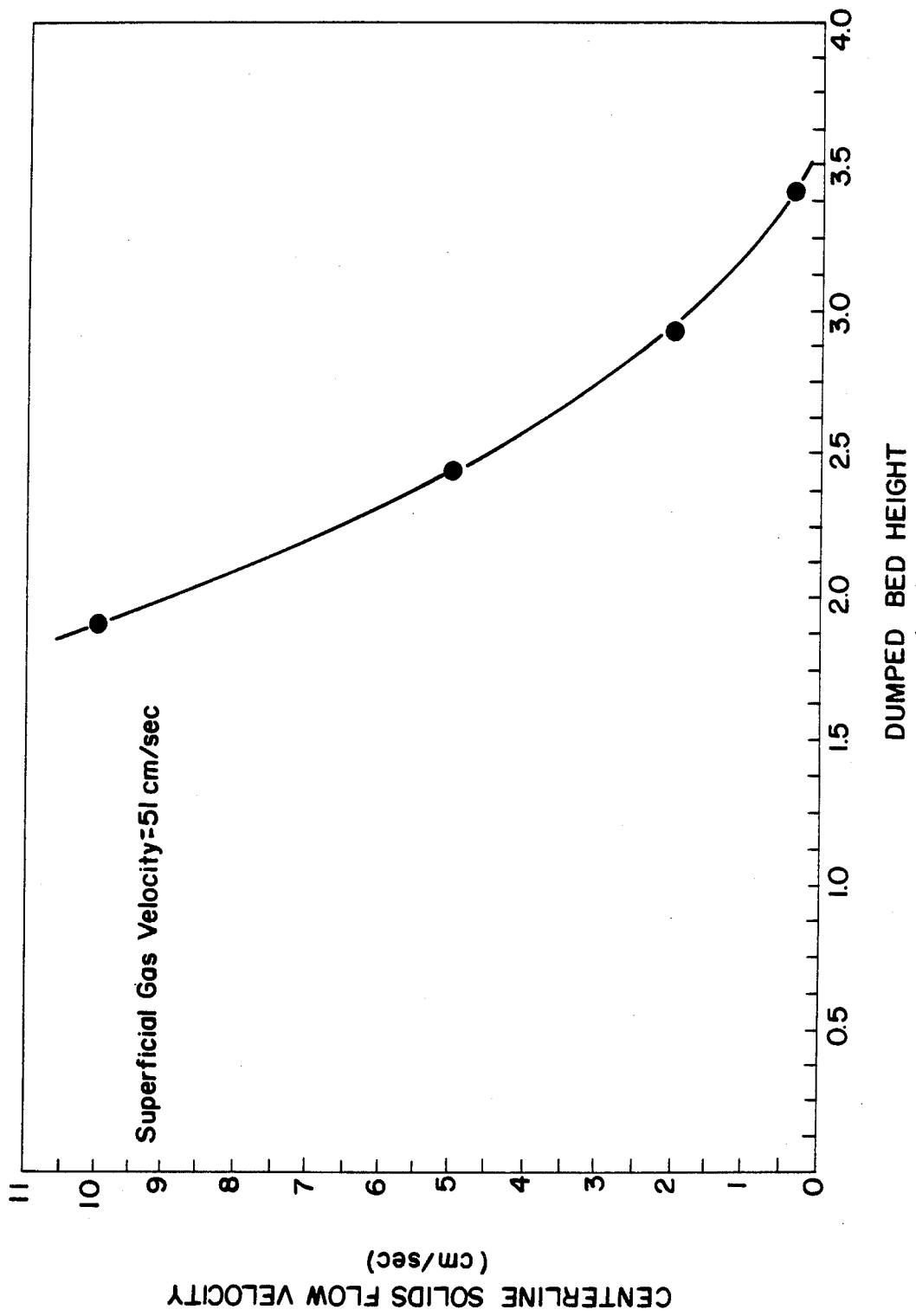
FIG. 12 illustrates the effect of bed height on solids flow rate in a fluid induced transverse flow magnetically stabilized fluidized bed.

FIG. 12 illustrates the effect of bed height on solids flowrate at constant superficial fluidizing gas velocity for −30 +35 U.S. Sieve composites.

EXAMPLE 4

The apparatus of Example 3 was used to separate a mixture of methane and n-hexane chromatographically. However, a small baffle on one side of the bed was used to obtain a smooth flow of solids at a bed height of 6.5 cm. The solids used were a composite of 70 wt.% stainless steel and 30 wt.% alumina sieved to −30 +35 U.S. Sieve.

The mixture was injected at a point in the bottom of the bed. While the methane was pure, the n-hexane was produced in a heated bubble column and contained argon. The superficial velocity of the fluidizing air was 63 cm/sec, the solids transverse flow velocity was 0.46 cm/sec and the magnetic field was 232 Oersted. A flame ionization detector with a sample delay time of 1.8 second was used to determine the elution position of the peaks. The detector probe speed in the direction of solids flow was 0.085 cm/sec.

Figure 13:
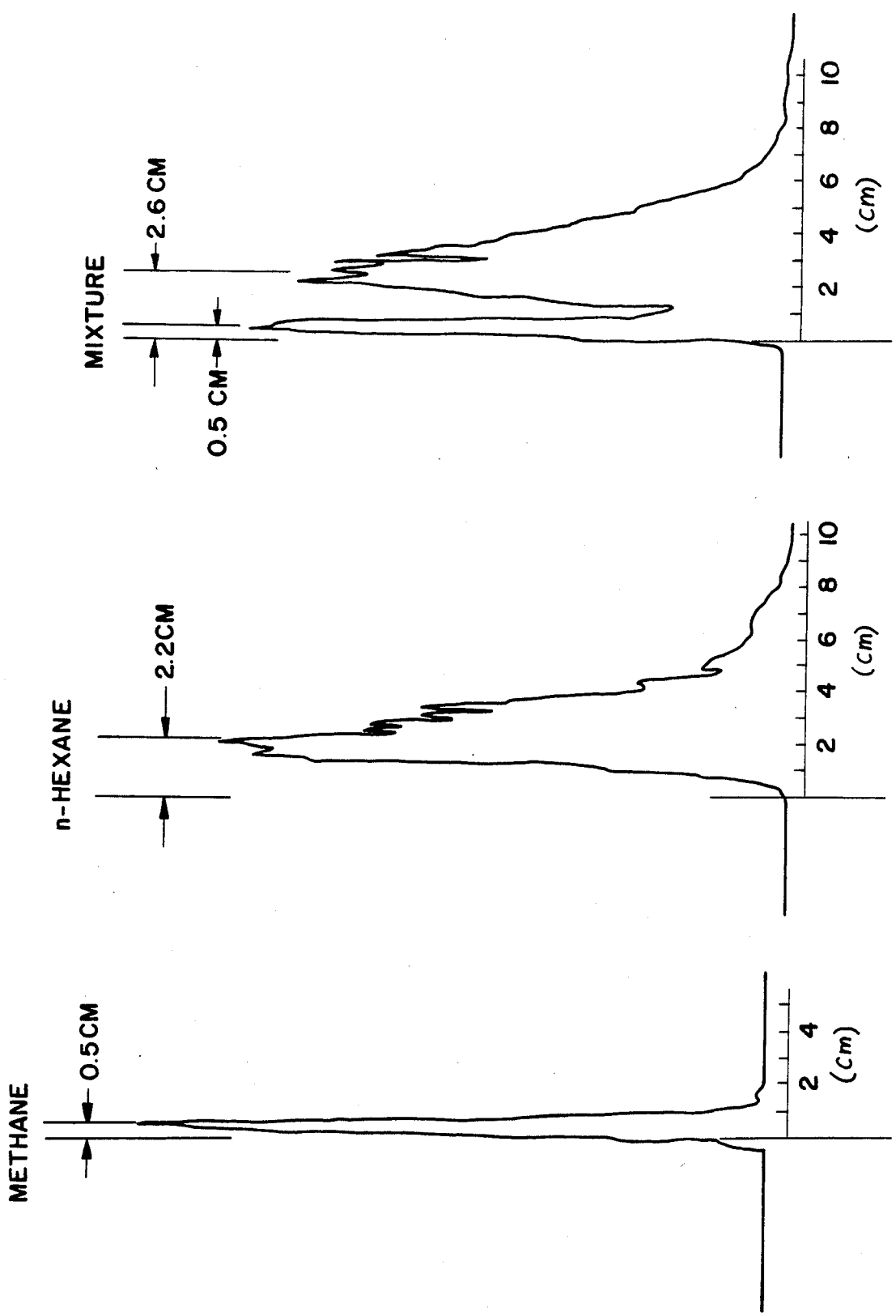
FIG. 13 shows the elution curves of methane and n-hexane separately and for the mixture in a fluid induced transverse flow magnetically stabilized fluidized bed.

A strip-chart recording for the individual components and the mixture is shown in FIG. 13.

EXAMPLE 5

Figure 14:
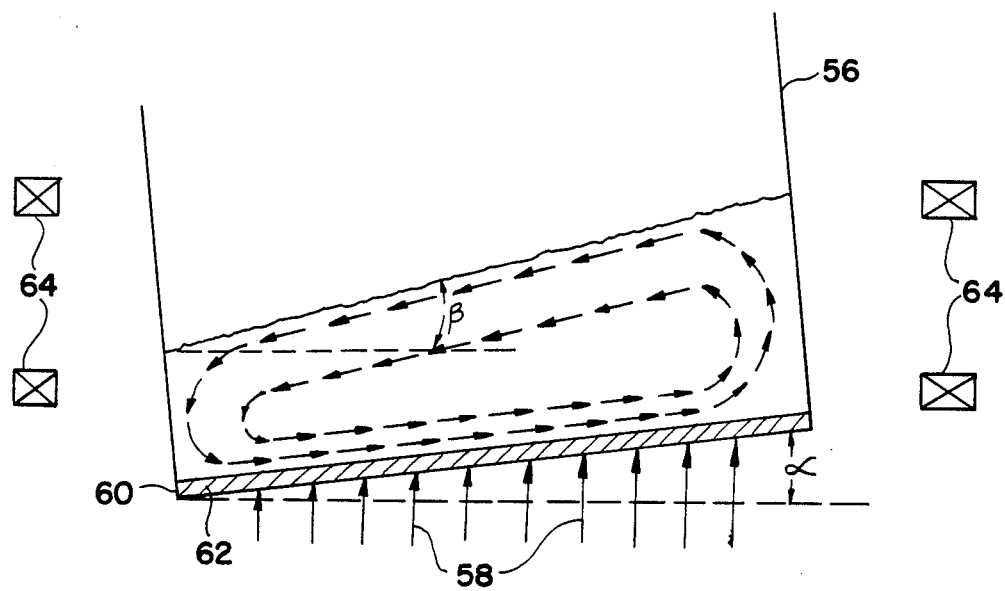
FIG. 14 illustrates an experimental apparatus employed to study the transport of solids in a fluid induced self-circulating transverse flow magnetically stabilized fluidized bed.

The stainless steel/alumina composite particles of Example 1 were placed in a rectangular shaped vessel 56 measuring 2.54 cm wide and 32.5 cm long as shown in FIG. 14. The particles were fluidized by air 58 passing through the distributor grid 60 described in Example 1 and illustrated in FIGS. 4b and 4c which contained holes 62 slanted at an angle of 25° to the vertical. As shown in FIG. 14, the grid was tilted on an angle $\alpha$ with respect to the horizontal i.e., the grid was inclined in the direction of solids flow in the lower portion of the bed near or adjacent to the grid.

The entire unit was plced in a vertical magnetic field supplied by the two electromagnets 54 described in Example 1.

Passage of the air 58 through the slanted holes 62 caused the solids at the bottom of the bed, in the vicinity of the grid 60, to move in the direction that the holes were drilled. Solids at the top surface of the bed were observed to move in a direction essentially opposite to the solids flow near the grid. Thus, a fluid induced self-circulating bed was established as shown by the arrows in FIG. 14.

In addition to the distributor grid being tilted with respect to the horizontal, the top surface of the bed was inclined at an angle $\beta$ with respect to the grid. Thus, the top surface of the bed was inclined at a total angle of $\alpha+\beta$ with respect to the horizontal.

Experiments were run at various conditions using the stainless steel/alumina composites and steel spheres of Example 2. The results of the experiments are shown below in Table 3.

TABLE 3

| Particulate Solids | Gas Superficial Velocity (cm/sec) | Solids Transverse Flow Velocity at Top of Bed (cm/sec) | Average Bed Height (cm) | Applied Magnetic Field (Oersted) | $\alpha$ | $\beta$ |
| --- | --- | --- | --- | --- | --- | --- |
| SS/Alumina | 99.2 | 3.5 | 4.2 | 44 | 1.9° | 1.8° |

TABLE 3-continued

| Particulate Solids | Gas Superficial Velocity (cm/sec) | Solids Transverse Flow Velocity at Top of Bed (cm/sec) | Average Bed Height (cm) | Applied Magnetic Field (Oersted) | α | β |
|---|---|---|---|---|---|---|
| Composite | 109.1 | 6.0 | 5.2 | 74 | 1.9° | 3.3° |
| | 134.1 | 12.7 | 4.8 | 148 | 1.9° | 6.0° |
| | 121.0 | 6.8 | 5.9 | 103 | 1.9° | 3.0° |
| | 134.1 | 9.7 | 6.2 | 133 | 1.9° | 3.6° |
| Steel Spheres | 121.5 | 3.1 | 3.2 | 30 | 1.9° | 1.5° |
| | 121.5 | 2.6 | 3.2 | 30 | 4.3° | 0.3° |

These experiments demonstrate that the fluidizing fluid can be used to initiate and maintain the continuous operation of a self-circulating magnetically stabilized fluidized bed. In addition, the runs using steel spheres show that at constant superficial gas velocity and applied magnetic field, $\beta$ decreases with increasing $\alpha$. Normally, $\alpha$ will be less than 45 degress and preferably less than 30 degrees. Typically, $\alpha$ will range from 0 to 20 degrees or less.

What is claimed is:

1. In a process for effecting fluid-solids contacting under fluidization conditions wherein a bed comprising fluidized magnetizable particles is contacted in a vessel with a fluidizing fluid which passes into the lower portion of said bed and exits from the upper surface of the bed, said bed being stabilized by a magnetic means having a strength sufficient to suppress solids backmixing, the improvement which comprises transporting at least a portion of said particles in a direction transverse to the flow of the fluidizing fluid exiting said bed by contacting said particles with at least a portion of the fluidizing fluid entering into said bed, said entering fluidizing fluid having a component of velocity in said transverse direction caused by passage through a distribution means.

2. The process of claim 1 wherein said magnetizable particles are composites of non-ferromagnetic material, ferromagnetic material, ferrimagnetic material or mixtures thereof.

3. The process of claim 1 wherein said magnetizable particles are admixed with non-ferromagnetic particles.

4. The process of claim 2 or 3 wherein said non-ferromagnetic material, ferromagnetic material, ferrimagnetic material or mixtures thereof has sorption properties.

5. The process of claim 2 or 3 wherein said non-ferromagnetic material, ferromagnetic material, ferrimagnetic material or mixtures thereof has catalytic properties.

6. The process of claim 1 wherein said entering fluidizing fluid is gaseous, liquid or a mixture thereof.

7. The process of claim 1, 2 or 3 wherein the particles comprising the bed are removed from a first contacting vessel and passed to a second contacting vessel.

8. The process of claim 1, 2 or 3 wherein the magnetic means is an externally applied magnetic field.

9. The process of claim 1, 2 or 3 wherein said magnetic means is a uniform magnetic field applied externally in a direction colinear with the flow of the fluidizing fluid leaving the upper surface of the bed.

10. The process of claim 1, 2 or 3 wherein said magnetic means is obtained using permanently magnetized particles.

11. The process of claim 1, 2 or 3 or 6 wherein a chemical reaction occurs during said fluid-solids contacting.

12. The process of claim 1, 2, 3 or 6 wherein a fluid mixture containing at least two components is separated continuously according to the steps comprising:
   (a) introducing said mixture into said bed;
   (b) contacting said mixture with an adsorbent in said bed for a period of time necessary to separate at least a portion of one of said components from said mixture;
   (c) recovering at least one product stream from said moving bed along the path of said bed, said product stream comprising a portion of the fluidizing fluid and a portion of the feed mixture containing at least a portion of one of said components.

13. The process of claim 1, 2, 3 or 6 wherein said bed of particles circulates in essentially the same direction in a closed loop within said vessel.

14. The process of claim 1, 2, 3 or 6 wherein heat transfer occurs during said fluid-solids contacting.

15. The process of claim 1, 2, 3 or 6 wherein particulate solids entrained in said entering fluidizing fluid are removed during said fluid-solids contacting.

16. A process for circulating a bed comprising fluidized magnetizable particles within a contacting zone while maintaining an essentially fixed inventory of said particles within said zone, said bed being fluidized by a fluidizing fluid that enters the lower portion of said bed and exits from the upper surface thereof, said bed being stabilized by a magnetic means having a strength sufficient to suppress particle backmixing therein, which comprises:
   (a) transporting the lower portion of said bed in a direction transverse to the flow of the fluidizing fluid exiting said bed by contact with at least a portion of the fluidizing fluid entering said bed, said entering fluidizing fluid having a component of velocity in said transverse direction caused by passage through a distribution means; and
   (b) transporting a portion of the particles comprising the upper portion of said bed in a direction essentially opposite to the direction said lower portion is transported.

17. The process of claim 16 wherein said distribution means is horizontal.

18. The process of claim 16 wherein said distribution means is inclined with respect to the horizontal in the direction of solids flow in the lower portion of said bed.

19. The process of claim 16 wherein a portion of the contacting zone is not stabilized by a magnetic means.

20. The process of claim 19 wherein any particulates entrained in the fluidizing fluid entering the bed are removed therefrom by:
   (a) contacting said entering fluidizing fluid with that portion of the bed passing through a portion of the contacting zone which is stabilized by a magnetic means such that said particulates are captured in said bed portion;

(b) passing the bed portion containing said captured particulates into a portion of the contacting zone which is not stabilized by a magnetic means such that the bed within the stabilized zone undergoes fluid bypassing and backmixing of the magnetizable particles;

(c) elutriating the captured particulates from the bed portion passing through the unstabilized zone by contact with a fluidizing fluid, said particulates being removed from said bed with the fluidizing fluid exiting the unstabilized portion of the contacting zone.

* * * * *